G. J. WARDWELL.
Stone Cutting Machine.
No. 2,088. Reissued Oct. 10, 1865.
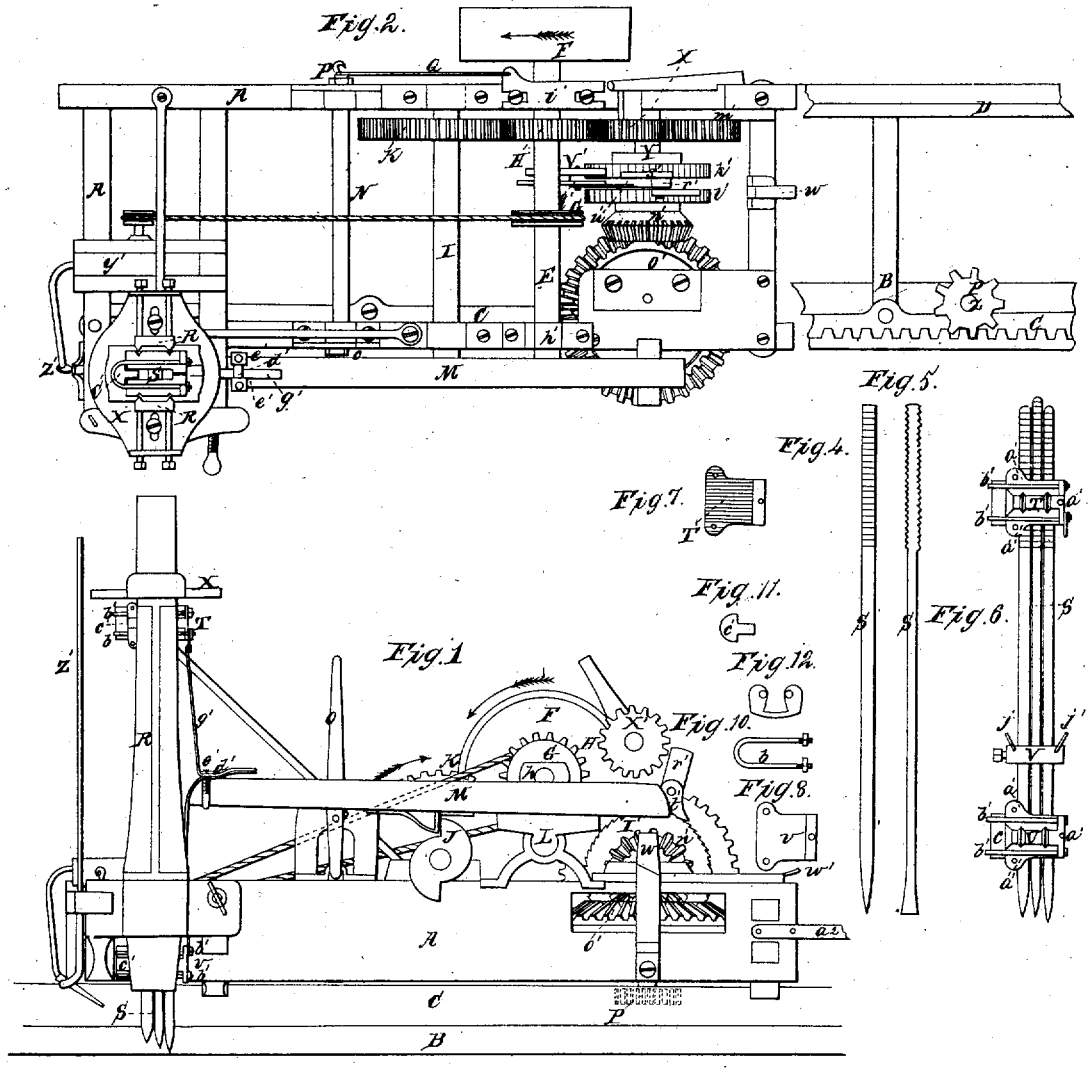
Witnesses.
R. T. Campbell
Edw Schaffer
Inventor.
Geo. J. Wardwell
by his atty
Mann Brickett & Lawrence
N. PETERS. Photo-Lithographer, Washington, D. C.

UNITED STATES PATENT OFFICE.

GEORGE J. WARDWELL, OF RUTLAND, VERMONT, ASSIGNOR TO THE STEAM STONE CUTTER COMPANY, OF NEW YORK, N. Y.

IMPROVED STONE-CUTTING MACHINE.

Specification forming part of Letters Patent No. 40,584, dated November 10, 1863; Reissue No. 2,088, dated October 10, 1865.

DIVISION No. 2.

*To all whom it may concern:*

Be it known that I, GEORGE J. WARDWELL, of Rutland, in the county of Rutland and State of Vermont, have invented a new and Improved Stone-Cutting Machine; and I do hereby declare that the following is a full, clear, and exact description of that part of my invention which relates to Division No. 2, reference being had to the accompanying drawings, making a part of this specification, in which—

Figure 1 is an elevation of one side of the machine mounted upon a track ready for operation. Fig. 2 is a plan view of the machine. Fig. 3 is an elevation of the rear end of the frame of the machine mounted upon a track. Figs. 4 and 5 show the form of the cutters. Fig. 6 shows the mode of uniting the cutters together in a gang. Figs. 7, 8, 10, 11, and 12 are detail views of parts of the head and foot clamps of the cutters. Fig. 9 is a side view of the slotted feed-plate and its attachments. Fig. 13 is a top view of a portion of the track and the pinion on a rack for moving the machine.

Similar letters of reference indicate corresponding parts in the several figures.

This part of my improvement in machinery for cutting channels in stone, for the purpose of removing large stones from quarries, relates to the automatic feeding of the machine up to the work as it progresses, so that the movement of the machine and the downward strokes of the cutters will take place alternately, for the purpose of causing the latter to strike in a different place at every blow, thus making a channel of uniform depth and of any desired length, according to the size of the stones which it is desired to quarry out.

My invention further relates to a mode of constructing the channeling machinery so that the operation of cutting can be performed as well in moving the machine backward as in moving it forward, for the purpose of saving time in operating the machine, as will be hereinafter described.

To enable others skilled in the art to understand my invention, I will describe its construction and operation.

In the accompanying drawings, A represents the frame of the machine.

B is the bed-frame, to which the rails or track is secured for the machine to move upon.

C is the feed-rail, which is furnished with a toothed rack on the inside, as shown in Fig. 13.

D is the off rail, which is on that side of the track most remote from the cutters.

The rails which constitute the track for supporting and guiding the machine as it is moved backward and forward in the operation of channeling stone are connected together by means of cross-ties in sections of sixteen feet, (more or less,) and these sections of rail are laid down upon the stone bed and properly leveled and secured in place before the machine is mounted upon them.

E is the main driving-shaft, one end of which is hung in a pivoted bearing, *h'*. Said shaft carries a pulley, G, and a pinion spur-wheel on the inside of the frame A, and a drum, F, on the outside of this frame, as shown in Fig. 2.

I is the cam-shaft, which is situated forward of and lower than the main shaft, and which carries a cam, J, on the outside of the frame A and a spur-wheel, K, on the inside of this frame, which wheel receives motion from the main shaft E by means of the pinion H.

N is a smaller shaft, which is situated forward of the cam-shaft I. To the ends of this shaft N levers O and P are attached, the former of which is on that side of the frame A upon which the cutters are arranged, and the latter is connected with the sliding bearing *i'* of the main shaft E by the rod Q. The object of these levers and connecting-rod is to enable the attendant to throw the main shaft E into and out of gear with the cam-shaft when it is desired to stop or to start the machine.

R R are two standards, both of which are furnished with two parallel V-shaped guides on their inner surfaces, on which the guide-blocks T and U, with their gang of cutters S, move. These standards are situated near the forward end of the frame A, one of which is permanently attached to the outside of this frame, while the other is made adjustable, and after removing the cap or collar X this latter standard can be swung from its position for putting in or taking out a gang of cutters, and for making any other changes with the cutters that may be required in operating the machine. The top ends of the gang of cutters have their sides corrugated or serrated crosswise, as represented in Figs. 4 5, and 6. The guide-blocks T, at the head of the gang of cutters, have a portion of their inner surfaces corrugated to correspond with the corrugations on the cutter-stems. (See Fig. 7.) The outside surfaces of said guide-blocks are furnished with grooves that receive the V-shaped guides on the standards. A guide-block is placed on each side of the cutter-stems, and the two blocks are bolted together by means of three transverse bolts, *a′ a′ a′*. They are then firmly compressed edgewise by means of clamp-rads or bolts *b′* and a packing-block, *c′*. The foot guide-blocks V have no corrugations on their inner surfaces, but in all other respects are like the head-blocks, and are bolted and clamped in a similar manner, as represented in Fig. 6.

The object of the corrugations in the sides of the cutter-stems and the corresponding ones on the inner surfaces of the head guide-blocks is to prevent the cutters from changing their relative position with respect to each other in the gang, when these cutters have been properly adjusted and clamped together. At the same time it does not limit any one cutter to a particular place in the gang, as each can be turned round or made shorter by sharpening or repair, thereby allowing drills or cutters of different lengths to be used in any required place in the gang.

The number of cutters is not necessarily limited to three, as shown in the drawings, as any other number may be used, according to the size and capacity of the machine. These cutters are intended to be so arranged in relation to each other that the cutting-point of each shall be lower than the one preceding it.

The foot guide-blocks are intended to be used as near the lower ends of the standards as may be found practicable, and they are to be loosened and secured higher as the cutters work deeper into the channel in the stone.

V is a clasp that embraces the cutter-stocks, and that occupies a place above the foot guide-blocks and below the end of the vibrating beam M. This clasp is secured in position by a set screw or bolt, as shown in Fig. 6, and it is furnished with a ring, *j*, on each end, and is connected to the forward end of the beam M by means of a strap, *f*, which passes over the end of this beam, and is secured thereto by a plate, *d′*, and bolts *e′*.

L is a rock-shaft, to which is attached, in any suitable manner, the beam M on the outside of the frame A.

W is a rubber or metallic spring, situated under the rear end of beam M, and back of the rock-shaft L, for the purpose of giving additional impetus to the drills or cutters in their descending strokes.

*g′* is a strap, one end of which is attached to a loop, Fig. 12, on the head guide-blocks, and the other end passes under the plate *d′* on the beam M, and is secured with the strap *f′* for raising the cutters. The object of the strap *g′* is to communicate the force of the rubber or metal spring W to the cutters.

Y is the feed-shaft, which is situated near the rear end of the frame A, as shown in Fig. 2, carrying the ratchet-wheels *k′* and *l′*, gear-wheel *m′*, and bevel-pinion *n′*.

Z is a vertical shaft, carrying the bevel spur-wheel *o′* at its top end and the pinion *p′* at its lower end. This pinion *p′* works in the teeth of the rack C on the inside of the rail or track, as shown in Figs. 3 and 13.

*q′* is a slotted plate, which is attached to the rock-shaft L for giving motion to the ratchet-wheels, and is what I term a "double-acting feed-arm."

*r′* is a vibrating lever, the lower end working loosely on the feed-shaft Y, as shown in Fig. 9, between the two ratchet-wheels *k′ l′*. The upper end of this lever is furnished with two fingers or pawls, *s′* and *t′*, each intended to work in the teeth of their respective ratchet-wheels, as occasion may require.

*u′* is a connecting-rod, one end of which is attached to a projection on the edge of the vibrating lever *r′*, and the other end to a stud or bolt, *b″*, in the slot of the double-acting feed-arm *q′*, as shown in Fig. 9.

*v′* is a stay finger or pawl, which is hung loosely on the rock-shaft L, and which works in the teeth of the ratchet *k′*.

*w′* is a stay or dog, which is attached to the rear end of the frame A, and intended to work in the teeth of the ratchet-wheel *l′*. Each one of said stay fingers or dogs is used as occasion may require.

*x′* is a gear-wheel, which is attached to a lever on the back side of the frame A, as shown in Figs. 1 and 2, and is thrown into gear with the pinion H on main shaft E and gear-wheel *m′* on the feed-shaft Y when it is desirable to run the machine back without working the drills or cutters.

*y′* is a revolving fan, at the forward end of the machine, which is driven by pulley G on the main shaft. Said fan is intended for blowing chips and dust from under the cutters.

*z′* is a rod, in front of the cutters, with an eye formed in its lower end for receiving and supporting the nozzle of the wind-pipe and giving direction to the same. This rod *z′* can be raised or lowered as the depth of the trench may require.

The operation of the machine is as follows: The main shaft E is rotated by any suitable prime mover applied so as to move with the machine upon its track. The pinion H is moved into gear with the spur-wheel K on the cam-shaft I. The feed and stay fingers *s′* and *y′* are placed on the ratchet-wheel *l′*. The main shaft E being revolved in the direction indicated by the arrow on the drum F, Fig. 2, the pinion H and spur-wheel K will communicate motion to the cam-shaft I and cam J, which latter raises the beam M, together with the cutters S and their guide-blocks T U and the clasp V. At the same time the spring W is compressed, the rock-shaft L with the double-acting feed-arm $q'$ make a partial revolution, which vibrates or moves the lever $r'$ with pawls or feed fingers $s'$ $t'$. The end of the finger $s'$ catching in the teeth of the ratchet-wheel $l'$ causes the same, with the feed-shaft Y, vertical shaft Z, and pinion $p'$, to make a partial revolution, thereby moving the whole machine forward on the track simultaneously with the rising of the cutters. After the cutters have been raised to their highest point they are immediately forced downward by the action of the spring W and their own gravity, thereby bringing the cutting-points in contact with the surface of the stone to be cut. As the drills or cutters rise, the wind created by the revolving fan $y'$ will blow away any chips or dust from the channel or trench. These movements of the cutters are repeated until the machine has traveled the required distance, when further movement is stopped by adjusting the pinion H out of gear.

In order to adjust the machine for cutting backward, the cap-plate X is removed, the outside standard R is swung from its position, the straps $g'$ and $f'$ are detached from the beam M, and the gang of cutters reversed. The straps, standard, and cap-plate are then properly adjusted, the feed and stay fingers are removed from the ratchet-wheel $k'$, and the feed and stay fingers $t'$ and $w'$ are adjusted so as to work in the teeth of the ratchet-wheel $l'$. The stud $b''$ in the slot of the double-acting feed-plate $q'$ is loosened and moved to the lower end of said slot, as indicated in red lines, Fig. 9, which will reverse the movement of the vibrating arm or lever $r'$. The machine can now be moved again. The feed-finger $t'$, working in the teeth of the ratchet-wheel $l'$, causes the feed-shaft, and also the vertical shaft and their gears $m'$, $n'$, $o'$, and $p'$, to make a partial revolution, and the machine to move while the drills or cutters are being raised in an opposite direction to that above described.

From the above description it will be seen that the mechanism for moving the machine along as the work progresses is so timed with respect to the mechanism for giving motion to the cutters that the machine is stationary while the cutters are descending, and is only moved while they are ascending. By thus providing for feeding or moving the machine upon its track the operations will be automatic, and require very little attention. When the machine has reached the required point, in moving either backward or forward, it is only necessary to adjust the feed and stay pawls to reverse the movements of the machine. In this way a continuous channel of any required depth and length can be cut into stone. It will also be seen that by gearing the machine to the track upon which it moves and providing for preventing any lateral movement of the frame of the machine channels of uniform widths can be made without injury to the cutters, and that such channels will be parallel to the line of the track upon which the machine moves.

I do not claim, broadly, giving a backward and forward movement to the stone-cutting machine, but desire to confine my invention, set forth in the first clause of the claim, to a machine which is provided with reciprocating cutters working in guides, and also with means for confining it in a fixed position during the descent of said cutters.

Having thus described my invention, what I claim as new, and desire to secure by Letters Patent, is—

1. Giving a forward or backward movement to the stone-cutting machine at pleasure and simultaneously with the upward stroke of the reciprocating cutters S, and confining said machine positively in position upon its track during the descending stroke of the said cutters, substantially in the manner described.

2. The double acting feed-arm $q'$, connecting-rod $u'$, and vibrating lever $r'$, combined and operating substantially in the manner described.

3. Accelerating the descent of the cutters S by means of a spring, W, applied to the beam M, substantially as described.

4. Connecting the cutters S to the beam M, or its equivalent, by means of straps $g'$ $f'$, substantially in the manner described.

5. The clamps T U, constructed and applied to the cutters S substantially as described, and adapted to receive the guides on the standards R, substantially as set forth.

6. Securing the cutters together rigidly by means of clamps or clasps which receive teeth or projections formed on said cutters, substantially as described.

GEO. J. WARDWELL.

Witnesses:
W. G. VEAZEY,
BEN K. CHASE.